2,748,140

3-HYDROXYMETHYL-4-PHENYLTETRAHYDRO-PYRIDINES AND THEIR ESTERS

Claude J. Schmidle, Moorestown, and Richard C. Mansfield, Haddonfield, N. J., assignors to Rohm & Haas Company, Philadelphia, Pa., a corporation of Delaware No Drawing. Application October 7, 1954,
Serial No. 461,024

6 Claims. (Cl. 260—295.5)

This invention concerns 3-hydroxymethyl-4-phenyl-tetrahydropyridines having an N-alkyl or N-benzyl group and esters of these alcohols. This invention also deals with processes for the preparation of these compounds.

While simple hydroxymethyltetrahydropyridines have been reported in the literature, they have lacked the 4-phenyl group and other structural features which would support their utility in the pharmaceutical field or to yield functional derivatives which are thus useful.

We have found that 1-substituted-4-phenyl-1,2,3,6-tetrahydropyridines can be reacted with formaldehyde in the presence of sulfuric acid to give 1-substituted-3-hydroxymethyl-4-phenyl-1,2,3,6-tetrahydropyridines. The reaction is usually effected between 75° and about 110° C., or higher temperatures if pressure is used. The reaction product is separated after neutralization of acid in the reaction mixture. The product can often be distilled and sometimes can be crystallized for purposes of purification.

Reaction of these alcohols with carboxylic acids or their anhydrides yields esters. Useful pharmacologically active esters can be formed by conventional esterification methods from such monocarboxylic acids as acetic, propionic, and butyric, or from such a dicarboxylic acid as succinic. These esters have analgetic and anti-spasmodic properties.

As an alternate method for preparing these esters, we have found that a 1-substituted-4-phenyl-1,2,3,6-tetrahydropyridine can be reacted with formaldehyde in the presence of sulfuric acid in a monocarboxylic acid as solvent. In this way, the ester is directly isolated.

As a primary reactant there is used a 1-substituted-4-phenyltetrahydropyridine of the structure

where R is an alkyl or aralkyl group. While R may be an alkyl group such as hexyl, heptyl, octyl, nonyl, decyl, dodecyl, or octadecyl, it is preferably an alkyl group of one to five carbon atoms. The most useful aralkyl group is benzyl or alkylbenzyl, but other aralkyl groups including those from naphthyl compounds may be used.

A convenient way to make these 1-substituted-4-phenyltetrahydropyridines comprises starting with an α-methylstyrene, reacting it with formaldehyde and a primary, non-aromatic amine, RNH₂, in the presence of a hydrohalide as catalyst, thus forming a 6-methyl-6-phenyl-3-substituted tetrahydro-1,3-oxazine, and converting this compound by heating it between 75° and 150° C. in the presence of excess of aqueous hydrochloric or sulfuric acid or other non-oxidizing acid stronger than phosphoric acid until the said oxazine is substantially converted to 4-phenyl-1-substituted-1,2,3,6-tetrahydropyridine, and separating this product.

The first reaction, that of olefinic compounds including α-methylstyrene, formaldehyde, and primary amines, is described by Hartough et al. in U. S. 2,647,117. This reaction can yield as a main product a tetrahydro-1,3-oxazine. Here it is necessary to use an α-methyl compound and to have the phenyl group on the α-carbon atom. The phenyl group can carry one or more inert substituents, such as methyl, ethyl, isopropyl, or butyl, or chloro. The tetrahydro-1,3-oxazines may be separated in their basic form.

Typical conversions of such oxazines to the 4-phenyl-tetrahydropyridines which are here reacted with formaldehyde are shown in the following typical preparations.

PREPARATION A

A mixture of 75 parts by weight of water, 150 parts of concentrated sulfuric acid, and 74 parts of 3-n-butyl-6-methyl-6-phenyltetrahydro-1,3-oxazine ($n_D^{25}$, 1.5327) was stirred on a steam bath for six hours, cooled, poured into 500 parts of water, extracted with toluene and made basic with aqueous caustic soda solution. The material which separated was extracted with toluene, dried over potassium carbonate, and distilled to give 50 parts of 1-n-butyl-4-phenyltetrahydropyridine, distilling at 115–120° C./0.7 mm. and having a refractive index $n_D^{25}$, of 1.5440.

PREPARATION 2

A mixture of 75 parts of water, 15 parts of concentrated sulfuric acid, and 78 parts of 3-n-hexyl-6-methyl-6-phenyltetrahydro-1,3-oxazine ($n_D^{25}$, 1.5268) was stirred on a steam bath for six hours, allowed to stand overnight, poured into 1000 parts of water and made alkaline with caustic. The liberated basic material was extracted with toluene, dried over anhydrous potassium carbonate, and distilled to give 20 parts of 1-n-hexyl-4-phenyltetra-hydropyridine, distilling at 137–142° C./0.75 mm. and having a refractive index, $n_D^{25}$, of 1.5347.

PREPARATION 3

To 73 parts of 3,6-dimethyl-6-phenyltetrahydro-1,3-oxazine was slowly added 100 parts of concentrated hydrochloric acid. The mixture was stirred at 90–95° C. for three hours, allowed to stand overnight, and then stirred at 90–95° C. for another hour. After being diluted with 300 parts of water, the solution was made basic with sodium hydroxide and the liberated basic material was extracted with two 90 part portions of benzene, dried over anhydrous potassium carbonate, stripped, and distilled to give 57 parts of 1-methyl-4-phenyltetrahydropyridine, distilling at 80–95° C./0.75 mm. Hg. Neutral equivalent: found—172, calculated—173.

PREPARATION 4

A mixture of 60 parts of water, 120 parts of concentrated sulfuric acid, and 74 parts of 3-benzyl-6-methyl-6-p-tolyltetrahydro-1,3-oxazine was stirred and heated at 95–100° C. for six hours. It was left standing for 16 hours and poured into 500 parts of water. The resulting mixture was made alkaline with aqueous sodium hydroxide solution. The basic product was taken up with toluene. The toluene solution was dried over anhydrous potassium carbonate and distilled. At 168–175° C./0.7 mm. a fraction was taken which was 1-benzyl-4-p-totlyl-tetrahydropyridine

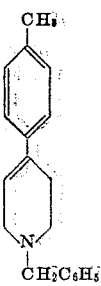

In the following illustrative examples, details are given of the reaction of various 4-phenyl-1,2,3,6-tetrahydropyridines with formaldehyde under the influence of sulfuric acid. This acid is conveniently used at concentrations of 25% to 50%, although both weaker and stronger acids may also be used. Even at 10% acid the reaction proceeds, but slowly. When the phenyl ring has an alkyl substituent the range of 10% to 50% is useful as such substituent facilitates the reaction, while with a chloro or bromo substituent the range is suitably 25% to 60%.

Example 1

A mixture of 165 parts of water, 117 parts of concentrated sulfuric acid, and 99 parts of 91% paraformaldehyde was heated and stirred until a clear solution was obtained and was then cooled to 50° C. There was added slowly 132 parts of 1-methyl-4-phenyltetrahydropyridine and the mixture was stirred on a steam bath for 7 hours and allowed to stand overnight. It was poured into 1000 parts of water and made basic with excess sodium hydroxide. The organic base separated and was extracted with benzene. The benzene extract was dried over anhydrous potassium carbonate and upon distillation yielded 90 parts of 1-methyl-3-hydroxymethyl-4-phenyltetrahydropyridine, distilling at 130–140° C./1 mm. This product crystallized upon standing and was recrystallized from a benzene-heptane mixture to give a white solid, melting at 98–100° C. A mixed melting point with the material made by a different method of synthesis showed no depression. This product contained by analysis 76.58% of carbon, 8.46% of hydrogen, and 6.82% of nitrogen. Calculated values are 76.8%, 8.43%, and 6.89% respectively. This compound has the structure

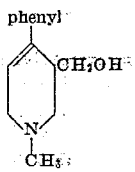

It is useful as a corrosion inhibitor in acidic systems. This utility holds for other alcohols of this invention.

Example 2

A mixture of 99 parts of 91% paraformaldehyde, 165 parts of water, and 117 parts of concentrated sulfuric acid was stirred and heated until a clear solution was obtained. It was then cooled to 50° C. and 146 parts of 3,6-dimethyl-6-phenyltetrahydro-1,3-oxazine were added slowly with stirring and cooling. The mixture was stirred and heated under reflux for 24 hours, cooled, and poured into 1000 parts of water. The aqueous solution was extracted with toluene and was then made basic with excess sodium hydroxide solution. The liberated organic base was taken up with toluene, dried over anhydrous potassium carbonate, and distilled to give 67 parts of 1-methyl-3-hydroxymethyl-4-phenyltetrahydropyridine, distilling at 125–145° C./0.7 mm. This material crystallized upon standing and was recrystallized from benzene-heptane to give a white solid melting at 98–100° C. A mixed melting point with the product of Example 1 showed no depression.

Example 3

A mixture of 26 parts of water, 19 parts of concentrated sulfuric acid, and 16 parts of paraformaldehyde was heated and stirred to a clear solution and then cooled to 50° C. There was added 25 parts of 1-n-butyl-4-phenyltetrahydropyridine and the mixture was stirred at 95–100° C. for 5 hours, allowed to stand overnight, poured into 300 parts of water, and made basic with caustic. The liberated basic material was extracted with toluene, dried over anhydrous potassium carbonate, and distilled to give 15 parts of 1-n-butyl-3-hydroxymethyl-4-phenyltetrahydropyridine, distilling at 145–160° C./0.7 mm. This product had a neutral equivalent of 245 (theory 245) and a refractive index, $n_D^{25}$, of 1.5412. This compound has the structure

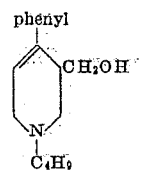

It contains by analysis 5.82% of nitrogen (theory 5.71%).

Example 4

A mixture of 33 parts of water, 22 parts of concentrated sulfuric acid, and 19 parts of paraformaldehyde was stirred and warmed to a clear solution and then cooled to 50° C. There was added 35.5 parts of 1-benzyl-4-p-tolyltetrahydropyridine and the mixture was stirred at 95–100° C. for three hours, cooled, poured into 500 parts of water, and made basic with caustic soda solution. The liberated material was extracted with toluene, dried over potassium carbonate, and distilled to give 34 parts of 1-benzyl-3-hydroxymethyl-4-p-tolyltetrahydropyridine, distilling at 200–210° C./1 mm. This crystallized on standing and was recrystallized from heptane to give a white solid melting at 102–104° C. This compound has the structure

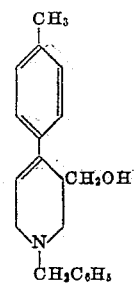

It contains by analysis 82.17% of carbon, 8.00% of hydrogen, and 4.86% of nitrogen. Theoretical values are 81.89%, 7.90%, and 4.78% respectively.

In the same way other N-substituted 4-phenyl-1,2,3,6-tetrahydropyridines are reacted with formaldehyde to give the 3-hydroxymethyl derivatives. These compounds are useful as corrosion inhibitors, having a favorable balance of properties from the presence of the solubilizing hydroxy group and the hydrophobic phenyl group. The alcohols are also useful as chemical intermediates, reacting, for example, with ethylene oxide to give polyethoxyethanols which have surface active properties, particularly when the phenyl group has one or more hydrocarbon substituents. Other reactions are discussed below.

Esters of the alcohols, examples of which are prepared above, can be formed by reacting the hydroxyl group with a carboxylic acid, its anhydride, or its acid halide. Conditions for carrying out such reactions are those generally used in esterification reactions. The procedures are best shown by the following illustrative examples:

Example 5

To a mixture of 100 parts of 20% caustic and 8.0 parts of 1-methyl-3-hydroxymethyl-4-phenyltetrahydropyridine was added 18.2 parts of benzoyl chloride. The mixture was well shaken, cooled, and extracted with ether. The ether extract was dried over potassium carbonate, filtered, and stripped to give 10 parts of a solid residue which was recrystallized from heptane and from a heptane-toluene mixture to 1-methyl-3-benzoxymethyl-4-phenyltetrahydropyridine. This compound melted at 80–83° C. and had a neutral equivalent of 303 (theory 307). Analysis of this compound gave the following data: carbon, 77.66%; hydrogen, 6.87%; and nitrogen, 4.34%. Corresponding theoretical values are 78.14%, 6.89%, and 4.56% respectively.

Example 6

A mixture of 58 parts of 1-methyl-3-hydroxymethyl-4-phenyltetrahydropyridine, 250 parts of propionic anhydride, and 1 part of concentrated sulfuric acid was stirred and heated at 100–110° C. for three hours, stripped to about 200 parts, poured into 1000 parts of water, extracted with two 100 part portions of toluene, and made basic with aqueous caustic soda solution. The liberated base was extrated with toluene, dried over anhydrous potassium carbonate, and distilled to give 36 parts of 1-methyl-3-propionoxymethyl-4-phenyltetrahydropyridine, distilling at 125–140° C./0.85 mm. It had a neutral equivalent of 253 (theory 259). Redistillation gave a center cut, distilling at 127–132° C./0.62 mm. which had a refractive index, $n_D^{25}$, of 1.5368 and a neutral equivalent of 255. This product contained by analysis 74.10% of carbon, 8.16% of hydrogen, and 5.40% of nitrogen. Theoretical values are 73.38%, 8.11%, and 5.60% respectively.

Example 7

A mixture of 72 parts of 1-methyl-3-hydroxymethyl-4-phenyltetrahydropyridine, 300 parts of acetic anhydride, and 1 part of concentrated sulfuric acid was stirred at 100–110° C. for four hours, allowed to stand overnight, stripped to about 150 parts, poured into 500 parts of water, and made basic with aqueous caustic soda solution. The liberated base was extracted with toluene, dried over anhydrous potassium carbonate, and distilled to give 54 parts of 1-methyl-3-acetoxymethyl-4-phenyltetrahydropyridine, distilling at 118–126° C./0.65 mm. This was redistilled to a center cut, distilling at 117–120° C./0.65 mm. It had a refractive index, $n_D^{25}$, of 1.5425 and a neutral equivalent of 236 (theory 245). It contained by analysis 72.99% of carbon, 8.10% of hydrogen, and 5.80% of nitrogen. Corresponding theoretical values are 73.44%, 7.81%, and 5.71% respectively. This compound has the structure

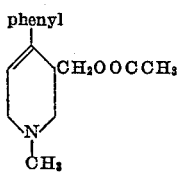

Example 8

A mixture of 300 parts of glacial acetic acid, 15 parts of acetic anhydride, 99 parts of paraformaldehyde, and 117 parts of concentrated sulfuric acid was stirred and warmed until a homogeneous solution resulted. There was then slowly added 132 parts of 1-methyl-4-phenyltetrahydropyridine and the mixture was stirred and heated at 95–100° C. for six hours. Excess acetic acid was removed under reduced pressure and the mixture was then poured onto 1000 parts of ice and made alkaline with caustic soda and potassium carbonate. The material which separated was extracted with toluene, dried over anhydrous potassium carbonate, and distilled to give 40 parts of 1-methyl-3-acetoxymethyl-4-phenyltetrahydropyridine, distilling at 116–121° C./0.75 mm. Hg and having a refractive index, $n_D^{24}$, of 1.543.

In the same way any other of the 1-substituted-4-phenyltetrahydropyridines herein described may be converted to the analogous 3-acetoxymethyl compound. Propionic acid may likewise be used as solvent and reactant to give corresponding propionoxymethyl derivatives.

While the esters and alcohols of this invention exhibit important pharmacological action, they are of even more interest as intermediates for forming other compounds of pharmacological value. For example, the double bond can be hydrated to yield interesting glycols, which in turn can be converted into 1,3-dioxanes by reaction with aldehydes. These combine the pharmacological activities of the 1,3-dioxane group and the 4-phenylpiperidine group.

By reaction of the 3-hydroxymethyl-4-phenyltetrahydropyridines and thionyl chloride there are obtained the 3-chloromethyl derivatives, which contain this reactive group and from which many kinds of derivatives are readily prepared. For example, hydration and reductive dehydrohalogenation yield the important alcohol

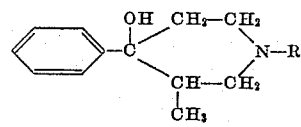

When these compounds are esterified, they yield potent known analgetics. For instance, the N-methyl compound reacted with propionic anhydride under the usual conditions for acylation yields 1,3-dimethyl-4-phenyl-4-propionoxypiperidine, known under the trade name Nisentil, when in the form of its hydrochloride.

Reaction with alkali cyanides yields 3-cyanomethylpiperidines which are hydrolyzed to form the lactone

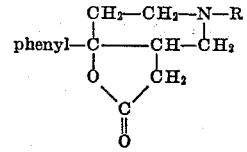

Similarly, reaction with sodium malonic ester followed by hydrolysis and decarboxylation yields the six-membered lactone

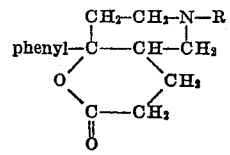

Hydration of the 1-substituted-3-hydroxymethyl-4-phenyl-1,2,3,6-tetrahydropyridines can be accomplished as shown in the following typical reaction.

A mixture of 11 parts of 1-methyl-3-hydroxymethyl-4-phenyltetrahydropyridine and 200 parts of glacial acetic acid is saturated with anhydrous hydrogen bromide at 10–20° C. over the course of 2 hours. The mixture is allowed to stand at room temperature overnight and is stripped to a dry solid under reduced pressure at a maximum temperature of 45° C. The residue is dissolved in 200 parts of water and is heated on a steam bath at 95° C. for 2 hours, cooled, and made basic with excess sodium hydroxide. The material which separates from solution is extracted with a mixture of toluene and ether, dried over anyhydrous potassium carbonate, filtered, and the filtrate is stripped of solvent under reduced pressure. A white solid is obtained which is recrystallized from toluene-heptane mixture to give a white solid melting at 146–148° C. In a typical preparation the product thus obtained had a neutral equivalent of 220. The theory for 1 - methyl - 3 - hydroxymethyl - 4 - phenyl - 4 - hydroxypiperidine is 221.

The compounds which are of direct interest in this invention have the structure

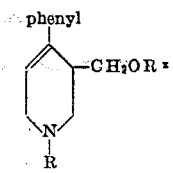

where R is an alkyl group, preferably of one to five carbon atoms, or an aralkyl group, preferably benzyl, and R$^x$ represents hydrogen or a carboxylic acid residue, —COR°, where R° is preferably an alkyl group of not even three carbon atoms or a phenyl group.

We claim:

1. Compounds of the structure

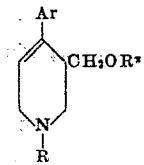

where R is a member of the class consisting of benzyl and alkyl groups, R$^x$ is a member of the class consisting of hydrogen, acyl groups of two to four carbon atoms and the benzoyl group, and Ar is a member of the class consisting of the C$_6$H$_5$— and CH$_3$C$_6$H$_4$— groups.

2. Compounds of the structure

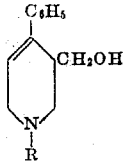

where R is an alkyl group of not over four carbon atoms.

3. A compound of the structure

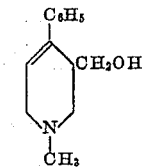

4. A compound of the structure

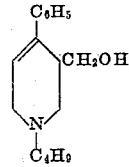

5. A compound of the formula

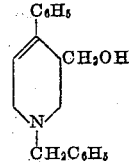

6. A compound of the formula

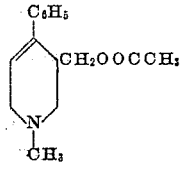

References Cited in the file of this patent
Karrer: Chem. Abst., vol. 43, col. 2582 (1949).